2,962,494
AZOPYRAZOLANTHRONES

William L. Berry, Neshanic, and William L. Mosby, North Plainfield, N.J., assignors to American Cyanamid Company, New York, N.Y., a corporation of Maine No Drawing. Filed Oct. 12, 1959, Ser. No. 845,625

3 Claims. (Cl. 260—162)

This invention relates to new azopyrazoleanthrones. More specifically, it relates to the compounds of the formula

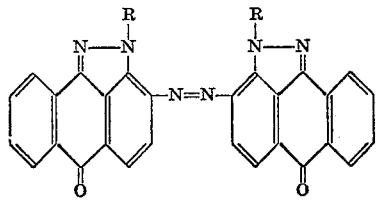

in which R may be hydorgen, alkyl, or aralkyl.

We have found a new class of dark red or violet vat dyes and vat pigments which are 3,3'-azopyrazoleanthrones having the above structure. These compounds are prepared by the reaction of 1-chloro-2-nitro-anthraquinone with a large excess of hydrazine. The reaction of the chloro nitroanthraquinone with two moles of hydrazine yields 2-nitropyrazoleanthrone. In the presence of large excesses, preferably about 10 moles of hydrazine per mole of 1-chloro-2-nitroanthraquinone, there is produced a dark solid which has the structure

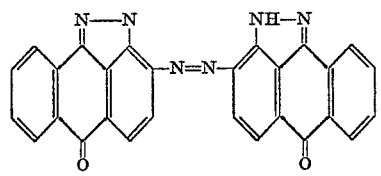

This product may be alkylated to replace the hydrogens on the pyrazole rings with alkyl and aralkyl groups. The dyestuffs so produced are usable as dark red or red brown vat dyes or can be used as vat pigments for resins and hydrocarbons. Further, the simple azo pyrazoleanthrone shown above readily forms metallic chelates when treated with metallic salts in dimethylformamide solution. These metallic salts themselves can be used as pigments.

The reaction between 1-chloro-2-nitroanthraquinone and hydrazine is carried out usually in a solvent. Dimethylformamide is preferred.

The alkylation to form the alkylated derivative of our invention is conveniently carried out in a solvent such as ortho di-chlorobenzene or nitrobenzene by treatment (or alkylation) with an appropriate benzene sulfonate or by the alkylation with the appropriate alkyl halide or sulfate in dimethyl formamide or one of the aromatic solvents such as nitrobenzene or chlorobenzene. Usually an acid binder should be present in this alkylation reaction.

Alkylation may be carried out with such alkylating reagents as dimethyl sulfate, diethyl sulfate, ethyl iodide, butyl bromide, amyl bromide, hexyl bromide, heptyl bromide, octyl bromide, dodecyl bromide, octadecyl bromide, benzyl chloride, methyl benzenesulfonate, ethyl benzenesulfonate, butyl benzenesulfonate, heptyl benzenesulfonate, lauryl benzenesulfonate, octadecyl benzenesulfonate, benzyl benzenesulfonate and the like.

Our invention can be illustrated by the following examples in which parts are by weight unless otherwise specified.

Example 1

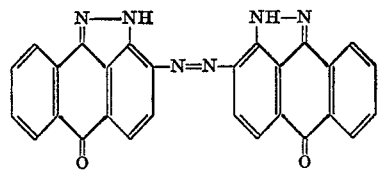

To a solution of 28.7 parts of 1-chloro-2-nitroanthraquinone in 500 parts of dimethyl formamide is added 57 parts by volume of 85% hydrazine hydrate. The mixture is heated at 130° C. until the reaction is substantially complete. The reaction mixture is then poured into water and the dark brown solid which forms is isolated by filtration. This may be recrystallized from nitrobenzene to give a black powder which dyes cotton a dark red from a deep blue vat.

Example 2

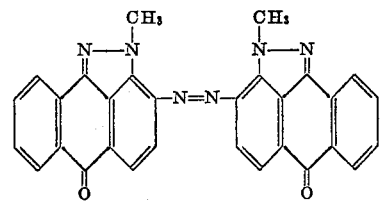

A mixture of 5 parts of the product of Example 1, 5 parts of sodium hydroxide, 50 parts by volume of methyl benzene sulfonate and 1000 parts of orthodichlorobenzene is stirred at 145° C. until the reaction is substantially complete. The cooled solution is filtered and the solid product is washed with ethanol and water. The dark solid dyes cotton a violet shade from a green vat.

Similar products are obtained when equivalent quantities of ethyl benzenesulfonate, butyl benzenesulfonate, lauryl benzenesulfonate or benzyl benzenesulfonate are used in place of the methyl benzenesulfonate.

Example 3

A plasticized polyvinyl chloride composition is prepared by milling together 100 parts of polyvinyl chloride, 50 parts of di-2-ethylhexyl phthalate, 2 parts of barium cadmium laurate, 1 part of a dry aryl phosphite and 5 parts of the product of Example 2. The milled composition is molded in the usual way to yield a brown polyvinyl chloride sheet.

We claim:
1. A compound of the formula

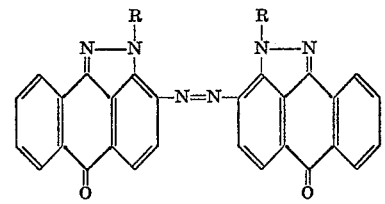

in which R is selected from the group consisting of hydrogen, alkyl and aralkyl.

2. The compound of the formula
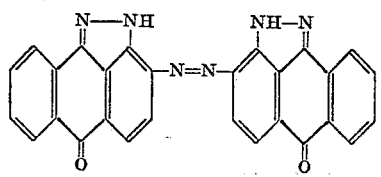
3. The compound of the formula
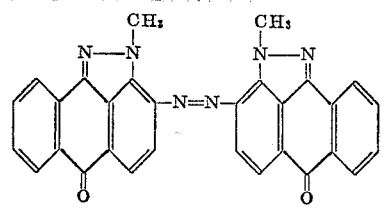
No references cited.

UNITED STATES PATENT OFFICE
CERTIFICATION OF CORRECTION

Patent No. 2,962,494                      November 29, 1960

William L. Berry et al.

It is hereby certified that error appears in the above numbered patent requiring correction and that the said Letters Patent should read as corrected below.

Column 1, line 27, for "hydoxgen" read -- hydrogen --; lines 38 to 44, the left-hand portion of the formula should appear as shown below instead of as in the patent:

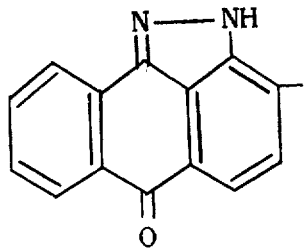

Signed and sealed this 9th day of May 1961.

(SEAL)
Attest:

ERNEST W. SWIDER
Attesting Officer

DAVID L. LADD
Commissioner of Patents